United States Patent [19]

King

[11] 4,204,035
[45] May 20, 1980

[54] SODIUM INSERT CONTAINER FOR A SODIUM-SULFUR CELL AND ITS METHOD OF USE

[75] Inventor: Randall N. King, Johnstown, N.Y.

[73] Assignee: Electric Power Research Institute, Inc., Palo Alto, Calif.

[21] Appl. No.: 945,623

[22] Filed: Sep. 25, 1978

[51] Int. Cl.² .............................................. H01M 10/39
[52] U.S. Cl. ..................................... 429/104; 429/112
[58] Field of Search ............... 429/104, 112; 29/623.2

[56] References Cited

U.S. PATENT DOCUMENTS

| | | | |
|---|---|---|---|
| 3,740,206 | 6/1973 | Christopher | 65/36 |
| 3,764,390 | 10/1973 | Thow | 429/112 |
| 3,959,013 | 5/1976 | Breiter | 429/104 |
| 4,029,858 | 6/1977 | Evans et al. | 429/104 |
| 4,112,203 | 9/1978 | Anand | 429/104 |

Primary Examiner—Donald L. Walton
Attorney, Agent, or Firm—Flehr, Hohbach, Test, Albritton & Herbert

[57] ABSTRACT

Molten sodium is filled into a reservoir insert container including a closed ended tubular portion and the sodium is solidified and the container sealed. Then the container is placed into the sodium compartment of a sodium sulfur cell so that the tubular portion extends into the electrolytic separator tube of the cell and is spaced apart therefrom forming an annular chamber. To activate the cell, the sodium is melted and an opening is formed in the insert container permitting flow of molten sodium from the container into the thus-formed chamber.

8 Claims, 2 Drawing Figures

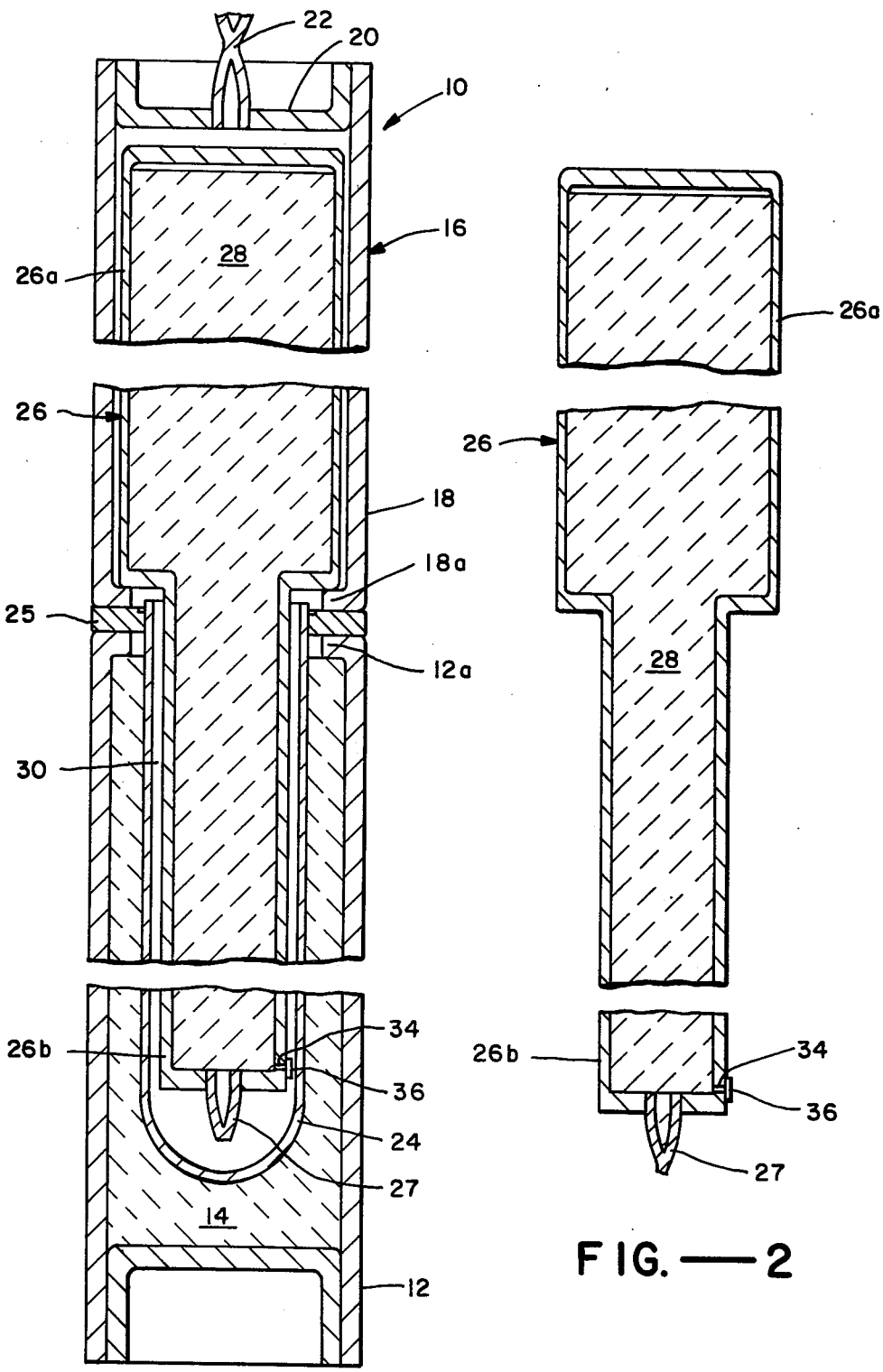
FIG.—1
FIG.—2

SODIUM INSERT CONTAINER FOR A SODIUM-SULFUR CELL AND ITS METHOD OF USE

CROSS-REFERENCE TO RELATED APPLICATIONS

Reference is made to related application Ser. No. 945,624 entitled "A Sodium-Sulfur Cell" in the names of Stephan P. Mitoff and Walter L. Roth and application Ser. No. 945,620 entitled "A Sodium Insert Container for a Sodium-Sulfur Cell and Method" in the names of Stephan P. Mitoff and Randall N. King, filed simultaneously herewith.

BACKGROUND OF THE INVENTION

The present invention relates to a sodium sulfur cell and more particularly to a safe economical method and means for filling the sodium compartment.

A conventional sodium sulfur cell includes separate containers for molten sodium and for molten sulfur. The latter container includes a main sodium compartment connected to a hollow solid electrolyte separator tube, conventionally formed of beta-alumina ceramic, with a closed end extending into the sulfur container. As illustrated in Christopher U.S. Pat. No. 3,740,206, the sodium fills the main sodium compartment and the separator tube. The sulfur container serves as the positive electrode, the sodium container as the negative electrode, and the separator tube as a solid electrolyte.

Filling of the highly reactive sodium in the sodium sulfur cell is a tedious process. In general, such sodium filling is performed under vacuum at temperatures above 100° C. with molten sulfur present in the sulfur compartment. However, this is a hazardous procedure as the sodium is being filled in the vicinity of molten sulfur which react violently with it if direct contact occurs. Alternatively, the sodium can be added to the cell by electrolysis of sodium nitrate. However, this process is time consuming and expensive and so is not practical for commercial scale production of such cells. Vacuum filling of the sodium at temperatures above its melting point is the most common commercial method.

Another problem with sodium sulfur cells is that since sodium and sulfur are highly reactive in the molten stage, any break in the beta-alumina separator tube during operation which permits direct contact of these molten materials leads to very hazardous conditions. In that regard, further handling and transportation of the cells requires cooling of the sodium and sulfur from the molten state to the solid state. Such solidification and other dimensional changes during cooling stress the beta-alumina electrolyte tube as well as other seals in the cell which could cause cracking.

SUMMARY OF THE INVENTION AND OBJECTS

It is an object of the invention to provide an improved sodium sulfur cell and method for filling sodium in the cell which overcomes the aforementioned disadvantages of conventional cells.

It is a particular object of the invention to provide a sodium sulfur cell which limits the amount of sodium which can contact the sulfur should a break occur in the partition between the sodium and sulfur.

It is a further object of the invention to provide a portable durable container of sodium capable of being inserted into the sodium compartment of a sodium sulfur cell in the solid state to provide the sodium requirements of such cell.

Further objects and features of the invention will be apparent from the following description taken in conjunction with the appended drawings.

In accordance with the present invention, a reservoir insert container is filled with sodium and sealed and thereafter placed as the sodium source into the sodium compartment of a sodium sulfur cell. The insert container includes a tubular portion which projects into the separator tube and is spaced apart therefrom forming an annular chamber. A port is provided in the insert container which releases molten sodium at the operating temperatures of the cell into the chamber to provide the negative electrode. Prior to operation, the container is suitably sealed as by blocking the port with a meltable solid plug which melts at the temperature of operation.

BRIEF DESCRIPTION OF THE DRAWING

FIG. 1 is a vertical sectional view of a sodium sulfur cell including the sodium containing reservoir insert means of the present invention.

FIG. 2 is a vertical elevational view of the reservoir insert container apart from the cell.

DETAILED DESCRIPTION OF THE PREFERRED EMBODIMENTS

Referring to FIG. 1, a conventional sodium cell is illustrated, generally designated by the reference number 10. The cell includes means forming a sulfur compartment in the form of a bottom container 12 which is constructed of an electrically conductive material, for example, stainless steel. As illustrated, it is closed at its bottom end and opened at its top end terminating in a rim 12a. Sulfur, generally designated as 14, is located within and entirely fills this container. Filling of the sulfur is performed by conventional techniques. As is conventional, the sulfur includes carbon felt. At room temperature, the sulfur is in solid form, while at the temperatures of operation, it is molten.

The cell also includes means forming a sodium compartment including a main compartment in the form of a second container 16, also constructed of an electrically conductive material, for example, stainless steel. Container 16 is located above container 12 and is inverted relative to the same, that is, it includes an upright cylindrical wall 18 with an inwardly projecting rim 18a extending around the wall defining an open bottom. A closed U-shaped top 20 is welded to the top of wall 18 and includes a pinch welded tube 22. The sodium compartment forming means also includes a sodium ion conductive solid electrolyte separator tube 24 with an open top facing the opening into container 16. Separator tube 24 is conventionally formed of beta-alumina ceramic. It extends from container 16 into the sulfur within container 12. During operation, the tube is filled with molten sodium. Tube 24 is supported in this position by means of a disc-shaped ceramic ring header 25, sealed between the rims 12a and 18a around the separator tube by known techniques to prevent leakage. Ring 25 is conventionally formed of alpha alumina ceramic. Suitable details of construction of a sodium sulfur cell including such seals are found in Breiter U.S. Pat. No. 3,959,013 incorporated at this point by reference.

The present invention resides in the use of a reservoir insert container for the sodium compartment of sodium sulfur cell 12. Such container, generally designated by the number 26, is illustrated apart from the cell in FIG. 2. It includes an upper enlarged reservoir portion 26a connected to an elongate lower tubular portion 26b terminating in a flat bottom. The container is essentially filled with sodium metal 28. A sealed pinch welded tube 27 is included on the bottom of portion 26b.

As illustrated in FIG. 1, when container 26 is inserted into the sodium compartment of cell 10, tubular portion 26b projects through the major portion of the length of separator tube 24 and is spaced apart therefrom forming a chamber 30 of annular or generally cylindrical configuration in the vertical plane and of plug shape between the bottoms of tube 24 and tubular portion 26b. Accordingly, tubular portion 26b is of a similar configuration to the inner surface of separator tube 24 but of a smaller external dimension. The upper enlarged reservoir portion 26a may be of any shape but is preferably of an enlarged cross-sectional area in comparison to tubular portion 26b providing a shoulder upon which insert 26 may be seated on rim 18. It also preferably conforms to the shape of sodium container 16. As will be set out below, a major purpose of enlarged reservoir 26a is to provide additional molten sodium to fill chamber 30 as the sodium is consumed during operation of the cell. It has been found that in the configuration of a conventional sodium sulfur cell, it is preferable to form enlarged reservoir portion 26a of greater volumetric capacity than tubular portion 26b.

Reservoir insert container 26 should be formed of a material which is capable of withstanding high stress. Also, for optimum electrical performance, it should be electrically conductive. A suitable container 26 is formed of mild steel of between 0.1 and 0.2 cm thickness with portion 26a including a volumetric capacity on the order of 250 cc while portion 26b includes a volumetric capacity of about 100 cc. In a suitable configuration, enlarged reservoir portion 26a is cylindrical with an outer diameter of 4.5 cm, an inner diameter of 4.1 cm and a height of 18.9 cm; and tubular portion 26b includes a height of 35.6 cm, an outer diameter of 2.2 cm, and an inner diameter of 1.9 cm. In a suitable cell, the distance between the outer perimeter of tubular portion 26b and the inner surface of separator tube 20 forms a chamber on the order of about 0.12 cm thickness. The exact annular spacing to form chamber 30 is not critical so long as there is a continuous layer of sodium in that chamber preventing direct contact of container 26 with the separator tube. Also for optimum operation, chamber 30 should be of generally equal thickness around its periphery. The details of filling chamber are set out below.

Another feature of reservoir insert container 26 is that it includes means forming a port permitting flow of molten sodium out of the container at the temperature of cell operation (about 300° C.) but retaining the sodium at room temperature and the temperature of molten sodium filling (about 125° C.). In the illustrated embodiment, such means includes opening 34 disposed toward the bottom of tubular portion 26b, sealed or blocked by a meltable plug 36 solid at the temperature of molten sodium, about 100° C. The precise positioning of the port is not critical so long as the opening is in communication with chamber 30 during operation of the cell. Plug 36 is formed of a material of low melting point which does not unduly contaminant the sodium during operation of the cell. It is believed that Wood's metal and Rose metal, lead cadmium based materials, with melting points above 125° C. and below 300° C., are suitable materials.

A suitable technique for filling container 26 apart from the cell is as follows. Prior to pinch welding, tube 27 opens into the interior of container 26 and provides a passageway for sodium filling. Container 26 is placed upside down and open tube 27 is connected by suitable valving, not shown, to a source of vacuum and a pressurized source of liquid sodium. The interior of container 26 is first subjected to a vacuum and, by an appropriate switch in valving, the molten sodium flows through tube 27 into the interior of container 26 to fill essentially the entire container. Thereafter, the container is sealed by closing tube 27, suitably by pinch welding the fill tube as illustrated. It should be understood that tube 27 may be placed in other portions of container 26, say at the top of the container, as illustrated, by providing more head space in the cell. After filling, the molten sodium is solidified and container 26 may be stored in this form until the desired use. In that regard, it is noted that by forming container 26 of a strong material such as mild steel, the container readily withstands any changes in dimensions which occur during cooling and solidification of the molten sodium.

Referring to FIG. 1, reservoir insert container 26, filled with solid sodium, is placed into cell 10 (assembled as illustrated) through the opening in the top of wall 18 prior to sealing with top 20. The shoulder of tubular portion 26a rests on lip 18a while tubular portion 26b projecting into separator tube 20 in spaced apart relationship. Thereafter, top 20 is sealed to wall 18 as by welding. It is preferable to fill the area of sulfur container 12 around separator tube 20 with sulfur prior to inserting container 26. This is because the bottom or sulfur portion of the cell may be preassembled so that the final cell formation is performed at the ultimate location in the simple manner of sealing top 20 to wall 18. The sulfur is filled in the bottom portion of the cell by conventional techniques.

To prepare the cell for operation, a vacuum is drawn on the upper compartment of the cell through tube 22 to pinch welding. As no seal is formed between container 16 and its support, the vacuum is sufficient to evacuate the entire space exterior of container 16, including chamber 30.

Then the cell is heated to a temperature (e.g., 300° C.) at which the sodium in container 26 and the sulfur in container 12 are molten. At those temperatures, a port is formed in tubular portion 26b, as illustrated by the melting of plug 36 permitting molten sodium to flow out through opening 34 and to fill chamber 30 under the influence of gravity. Sodium flows into chamber 30 at a rate determined by the size of opening 34. For most efficient operation, the sodium in chamber 30 should be filled at least as high as the upper level of the sulfur in container 12 or at least to the bottom of ring 25. During operation, the sodium is continuously consumed and so the rate of flow through opening 34 should be at least equal to the rate of sodium consumption. By way of example, a cell expected to produce a steady current of 40 amps would require a sodium flow rate of about 0.67 cc per minute. For this purpose, a suitable opening is sized at about 1.5–3.5 mm diameter.

During cell operation, container 26 contains all of the sodium except for that portion which flows through the opening into chamber 30 and possibly overflows above header 22 as the sodium seeks its own level under the influence of gravity. In the illustrated configuration, container 26 retains most of the sodium. The preferred material of mild steel provides a strong secure container for such molten sodium. This is an additional safety factor as, should a break develop in the relatively brittle separator tube 20, the bulk of the sodium is protected from direct contact with the sulfur by the steel container to prevent an uncontrolled chemical reaction between the sodium and sulfur which could conceivably melt the external cell wall. Another advantage of a steel container is that it is a good electrical conductor and so minimizes losses due to electrical resistance.

It is apparent from the foregoing that a method and means have been provided for filling a sodium sulfur cell which provides additional safety during filling as permitting the sodium to be filled in the solid state. Also, after the cell is formed it prevents uncontrolled sodium sulfur reactions if a break occurs in the separator tube. In addition, this technique is particularly adapted to mass production as the individual reservoir insert containers can be filled with sodium at one location under carefully controlled conditions followed by solidification and sealing of the sodium for shipment to remote locations where the reservoir insert container including solid sodium is readily inserted into a sodium sulfur cell. In that regard, shipment of the sodium reservoir insert container apart from the sulfur in the sodium sulfur cell is far safer than shipping of the cell as a single unit.

What is claimed is:

1. In an improved sodium sulfur cell including means forming a sulfur compartment, means forming a sodium compartment including a main compartment connected to a hollow solid electrolyte separator tube with a closed end extending into said sulfur compartment means, the improvement comprising a reservoir insert container for sodium disposed within said sodium compartment forming means and including a closed-end hollow tubular portion extending into said separator tube, said reservoir tubular portion being spaced apart from said separator tube so that a chamber is formed therebetween, means forming a port permitting flow of molten sodium from the interior of said reservoir insert container into said chamber at an elevated temperature at which molten sodium is formed, said port forming means comprising an opening in said reservoir insert container sealed by a meltable plug which is solid at room temperature and which melts at the temperature of cell operation.

2. The sodium sulfur cell of claim 1 in which said reservoir insert container includes an enlarged reservoir portion disposed within said sodium compartment forming means extending out of said separator tube.

3. The sodium sulfur cell of claim 2 in which said enlarged reservoir portion is of larger volumetric capacity than said tubular portion.

4. The sodium sulfur cell of claim 1 in which said reservoir insert container is formed of an electrically conductive metal.

5. A method for forming a sodium sulfur cell of a type including means forming a sulfur compartment and means forming a sodium compartment with a detachable lid, said latter means including a main compartment connected to a hollow solid electrolyte separator tube with a closed end extending into said sulfur compartment forming means, said method comprising the steps of (a) filling molten sodium through an opening into a reservoir insert container including a closed ended hollow tubular portion with a configuration similar to that of said separator tube, (b) solidifying said sodium, (c) sealing said reservoir insert container with a solid plug blocking an opening in said container which plug melts at the temperature of cell operation to permit the molten sodium to flow out of said container, (d) with said sodium compartment means lid detached, inserting said tubular portion of said reservoir insert container through the open end of said separator tube to project into the same in spaced apart relationship thus forming a chamber, and (e) attaching and sealing said sodium compartment forming means lid to said cell.

6. The method of claim 5 together with the following step:

(f) melting said sodium and plug and flowing the sodium from said reservoir insert container into said chamber.

7. The method of claim 5 in which said reservoir insert container is subjected to a vacuum and then filled with molten sodium.

8. The method of claim 5 in which a vacuum is applied to said chamber after step (e).

* * * * *